Oct. 18, 1955     G. A. BRETTELL, JR., ET AL     2,720,712
SIMULATOR FOR BATTLE MANEUVERS

Filed Nov. 30, 1945     12 Sheets-Sheet 1

Inventors
GEORGE A. BRETTELL JR.
FIRTH PIERCE

By

Attorney

Oct. 18, 1955  G. A. BRETTELL, JR., ET AL  2,720,712
SIMULATOR FOR BATTLE MANEUVERS
Filed Nov. 30, 1945  12 Sheets-Sheet 7
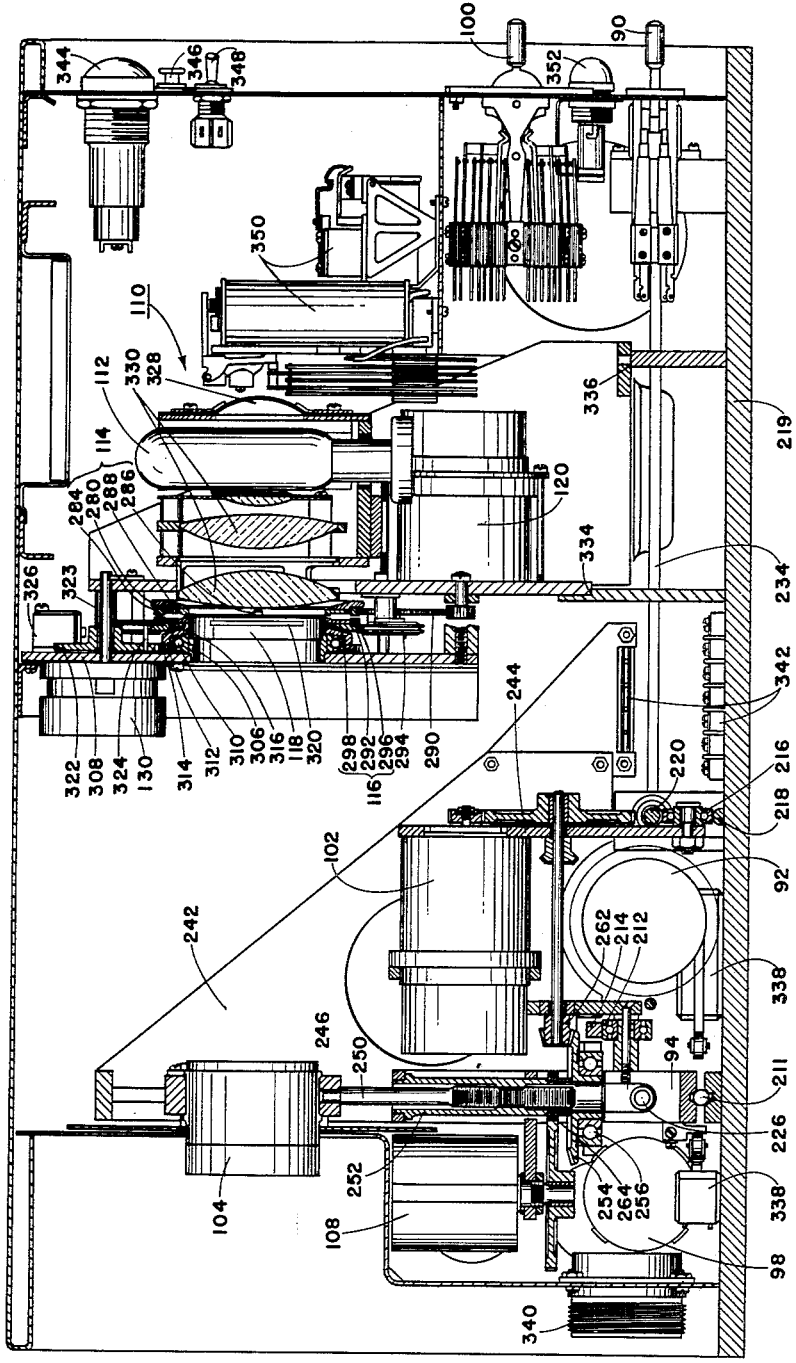
FIG. 7
Inventors
GEORGE A. BRETTELL JR.
FIRTH PIERCE
By 
Attorney Inventors
GEORGE A. BRETTELL, JR.
FIRTH PIERCE Oct. 18, 1955  G. A. BRETTELL, JR., ET AL  2,720,712
SIMULATOR FOR BATTLE MANEUVERS
Filed Nov. 30, 1945  12 Sheets-Sheet 9

Inventors
GEORGE A. BRETTELL JR.
FIRTH PIERCE

By M. O. Hayes

Attorney

Inventors
GEORGE A. BRETTELL JR.
FIRTH PIERCE

By M. O. Hayes
Attorney

Oct. 18, 1955  G. A. BRETTELL, JR., ET AL  2,720,712
SIMULATOR FOR BATTLE MANEUVERS
Filed Nov. 30, 1945                     12 Sheets-Sheet 11

Inventors
GEORGE A. BRETTELL JR
FIRTH PIERCE

By M. O. Hayes
Attorney

United States Patent Office

2,720,712
Patented Oct. 18, 1955

2,720,712

SIMULATOR FOR BATTLE MANEUVERS

George A. Brettell, Jr., and Firth Pierce, San Diego, Calif., assignors to the United States of America as represented by the Secretary of the Navy Application November 30, 1945, Serial No. 631,946

24 Claims. (Cl. 35—25)

The present invention is related generally to teaching and practice equipment, and more particularly to apparatus for simulating maneuvers of ships.

It is an object of the invention to provide means for optically projecting a plurality of ship images onto a screen and for accurately controlling the movements thereof in simulation of maneuvers of ships.

It is also an object to provide accurate simulations of torpedo fire and gun fire.

It is a further object to provide new and improved apparatus for accurately depicting maneuvers of ships and the firing of projectiles including both torpedoes and shells.

These and other objects and advantages will appear from the following description of one specific embodiment of the invention. In the drawings:

Fig. 7 is a view of the ship image projector, and constitutes a section along the line 7—7 of Fig. 8.

Figure 1:
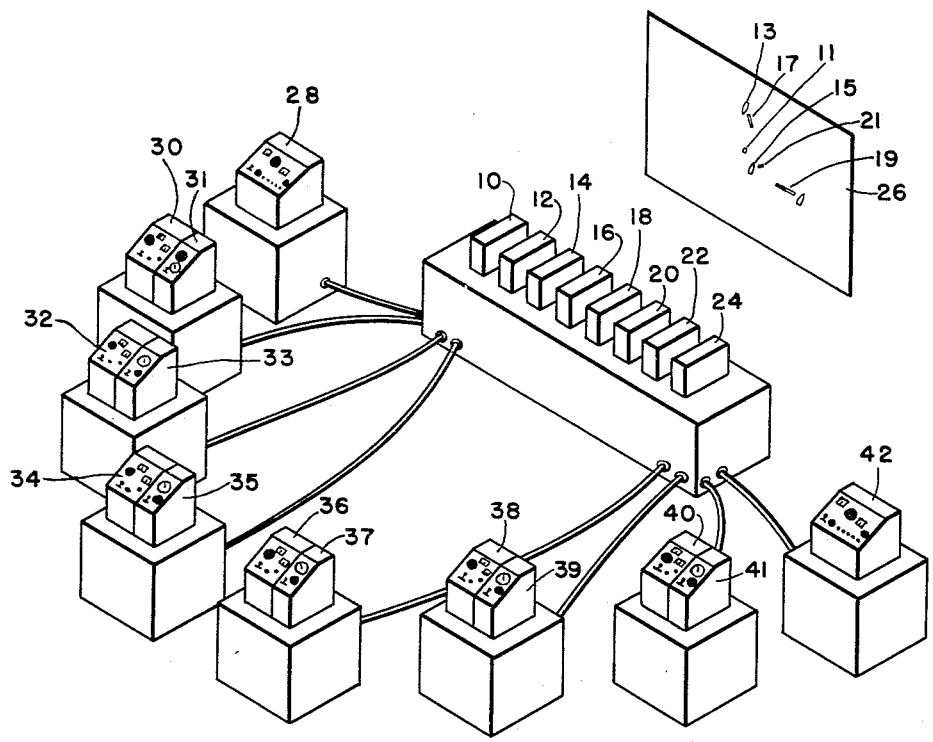
Fig. 1 is a pictorial view of a system of the present invention set up for operation.

In Fig. 1 a bank of optical projectors 10, 12, etc., project images such as the illuminated spots 11, 13, etc., on a screen 26. These projectors are controlled from remote manual control stations 28, 30, etc. This equipment is adapted to permit the simulation of battle maneuvers with a separate contestant controlling each ship. As shown here, six of the projectors, numbers 12 to 22, represent separate ships and projectors 10 and 24 depict torpedoes. Each ship image projector has two controllers at its manual station such as the conning controller 30 and the simulated gunfire controller 31 for ship image projector 12. The torpedo image projectors have single controllers 28 and 42. The rear panels of the projectors 10, 12, etc., include controls for the use of an umpire. Ships are represented on the screen by ship-like images 13, 15, etc. Ship's gunfire is depicted as a streak of light originating at the ship and moving outward in the direction of the simulated fire as at 17 and 19. Torpedoes are represented as round spots of light 11.

Figure 2:
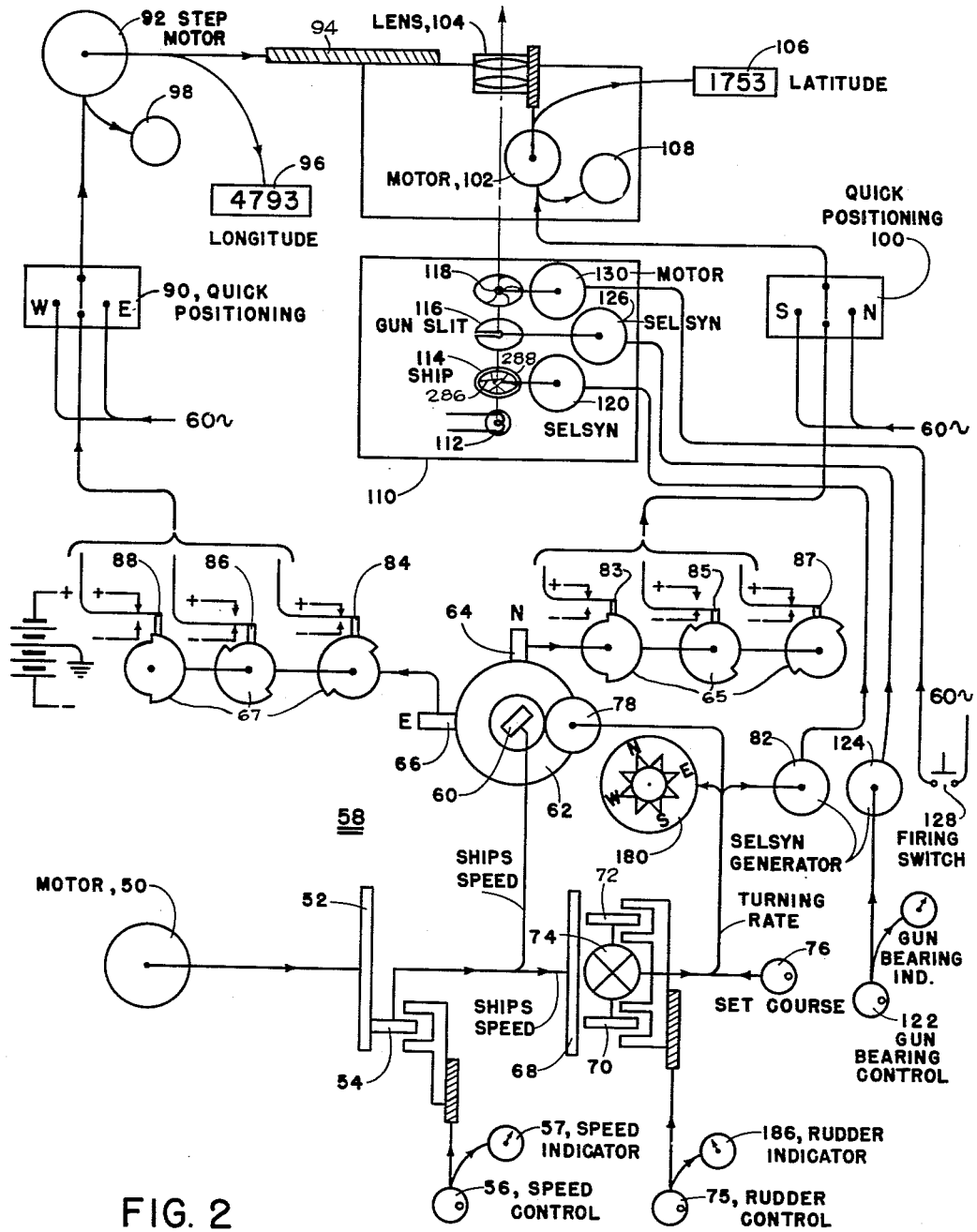
Fig. 2 is a simplified schematic diagram of the simulated ship's conning and gunfire controls.

Fig. 2 is a simplified schematic diagram showing the speed and course generating mechanisms of one of the ship control stations, such as 30—31, together with a representation of the manner in which the movements and gunfire control are imposed on the projector 12. A constant speed motor 50 drives a disk 52. A roller 54 in frictional engagement with disk 52 operates at a speed that depends on its distance from the center of the disk as controlled by speed adjusting knob 56. The speed of this roller 54 constitutes the ship's speed. This speed is applied to a ball resolving mechanism 58 which generates the east and north components of the ship's movement. It includes input roller 60 which drives a ball 62 which in turn drives output rollers 64 and 66. The angular position of input roller 60 determines the relative speeds of the north and east output rollers 64 and 66 and therefore determines the ship's course. This course is set by rudder simulating mechanism which operates as follows: Ship's speed is applied to a disk 68 which drives two rollers 70 and 72 in opposite directions. A differential 74 takes the difference of the speeds of these two rollers to constitute the rate of ship's turn, and the positions of the rollers 70 and 72 are set by a rudder control knob 75. Thus the rate of turning of the ship depends both on the rudder setting and also on the speed of the ship to simulate actual ship operation. For setting up problems a control 76 is provided for initially setting the ship's course. To make this setting it is necessary to turn the knob 76 with sufficient force to slide the rollers 70 and 72 on the face of the driving disk 68. The turning rate of the ship is applied to a gear 78 that controls the orientation of the input roller 60 of the ball resolver mechanism 58 and is applied also to the compass 180 (course indicator) and to a selsyn generator 82 the purpose of which will be described presently.

Each of the output rollers 64 and 66 of the ball resolving mechanism 58 drives a group of three double throw switches through cams which are set 120° apart. Thus roller 66 drives switches 84, 86 and 88, each of which makes connection alternately to the positive and negative terminals of a D. C. supply so that the three switches together generate a square wave three-phase voltage. This three phase voltage is applied through a positioning switch 90 to a step motor 92 which controls the horizontal motion of a carriage 94 of the projector 12. Motor 92 also drives a counter 96 which indicates the longitude of the ship and a potentiometer 98 which provides an electrical indication of the ship's longitude. Carriage 94 carries another motor 102 which is driven by the north-south voltages from step switches 83, 85, and 87 and controls the vertical position of objective lens 104. Motor 102 also controls a latitude counter 106 and a potentiometer 108 for electrical indication of latitude. Thus motor 92 by moving the carriage 94 horizontally moves also the lens 104 to impart horizontal or east-west motions to the ship's image on the screen 26 (Fig. 1). Similarly, the motor 102 by moving the lens 104 vertically imparts vertical or north-south motions to the image.

Included in the projector is a lamp house 110 containing a projection lamp 112, a ship's aperture 114, a gunfire aperture 116, and a gunfire iris 118. The ship aperture 114 consists of a perforated button 286 supported on fine wires at the center of a ring 288. It is rotated by selsyn motor 120 which is driven from selsyn generator 82 so that the orientation of the ship's image on the screen will properly indicate the direction of its motion. The gunfire aperture 116 includes a central hole for leaving the ship's image unobstructed and also a radial slit for producing the streak of light 17 (Fig. 1)

that is to represent gunfire. The iris 118 normally obscures most of the slit in the gun aperture 116, leaving only a small spot of light (such as 21 in Fig. 1) to show on the screen the direction in which the gun is pointed. The gunfire is controlled from gunfire unit 31 at the ship's control station (Fig. 1). As shown in Fig. 2, a manual control 122 operates a selsyn generator 124 which in turn drives a selsyn motor 126 which controls the orientation of the gun slit aperture 116. A gunfiring switch in the control unit applies power to a small electric motor 130 which slowly opens the iris 118 to uncover the gunfiring slit so that the streak of light progressively lengthens to simulate gunfire.

Figure 3:
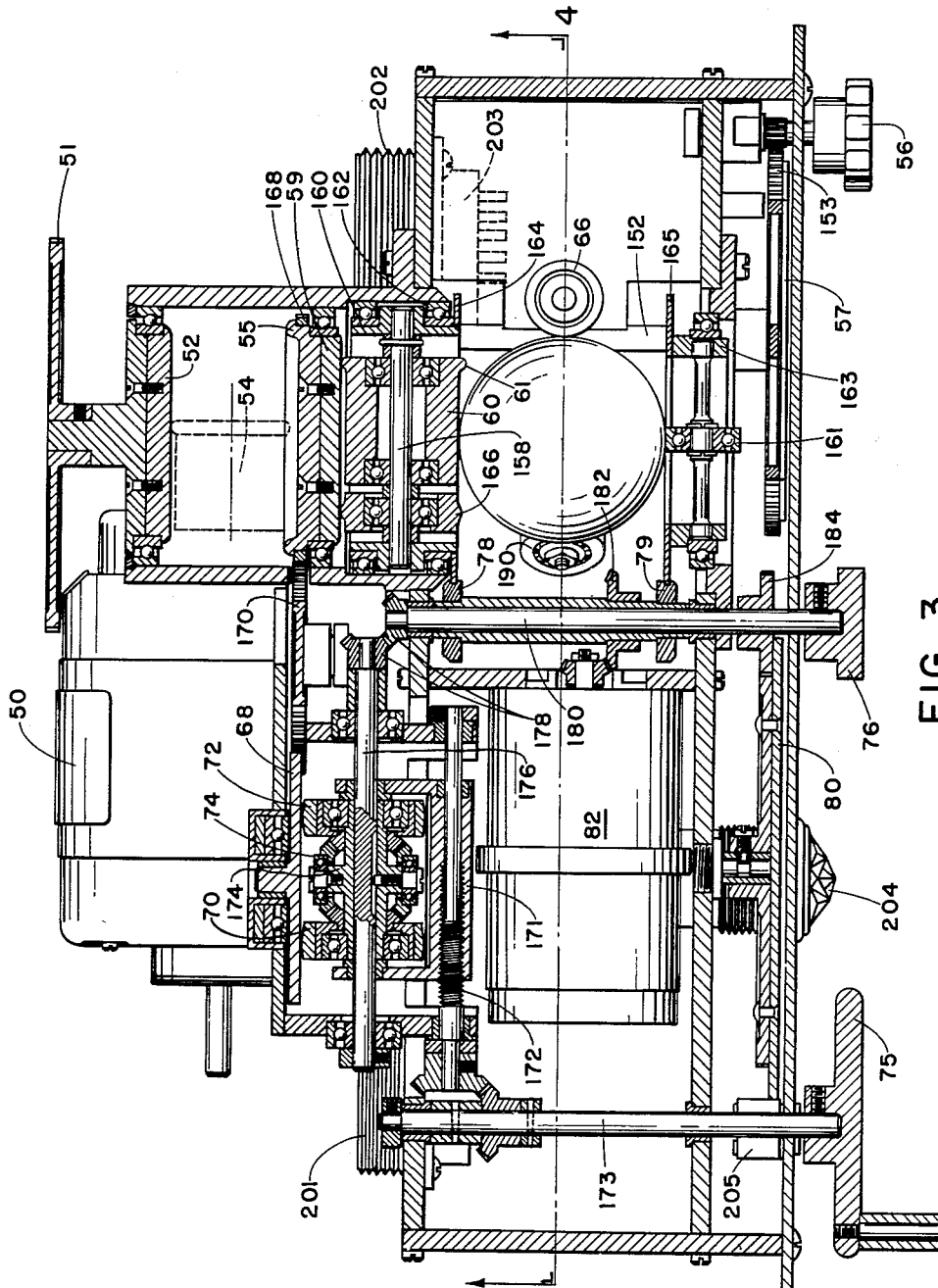
Fig. 3 is a section through the mechanism of the simulated ship's conning controller and constitutes a section taken along the line 3—3 of Fig. 4.
Figure 4:
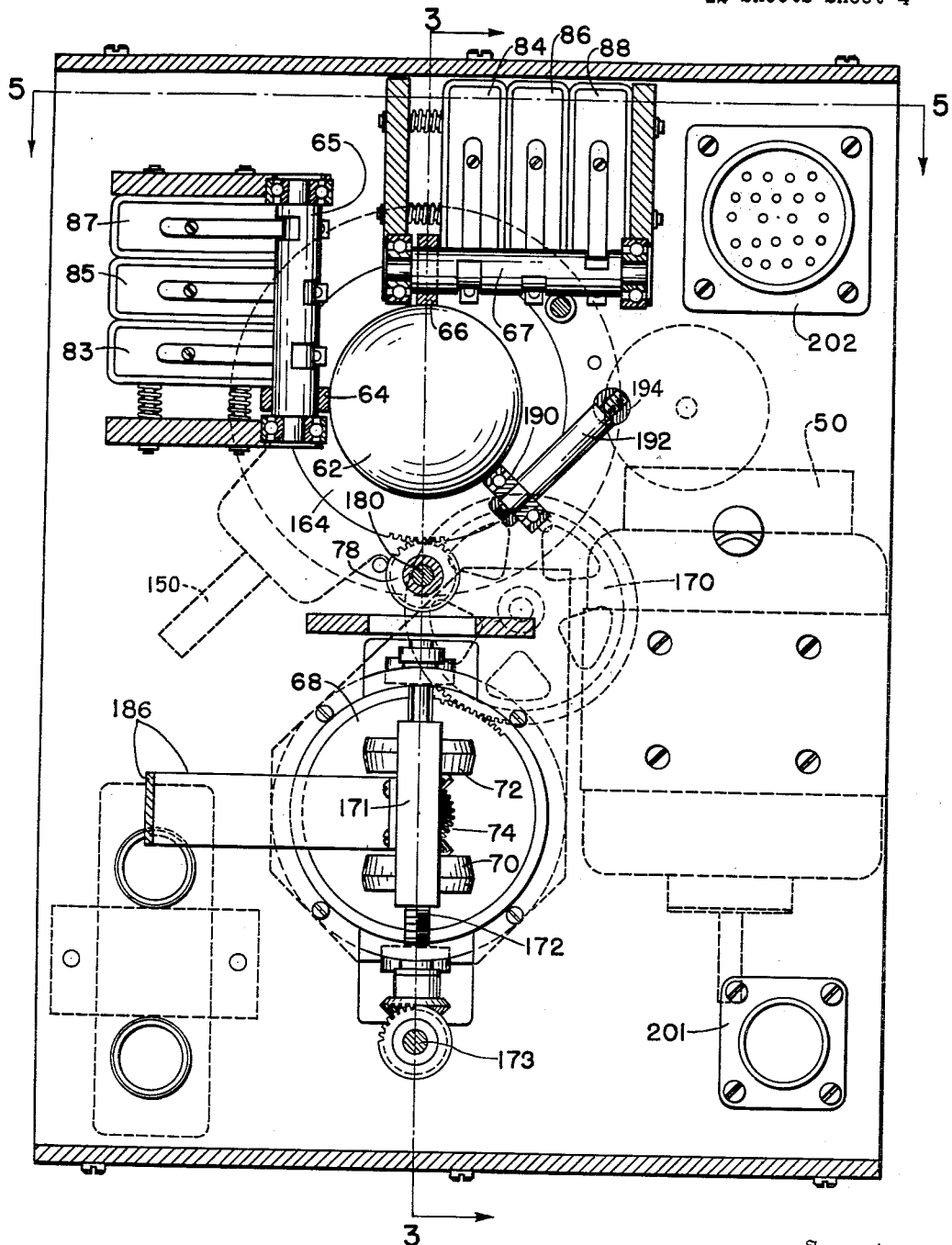
Fig. 4 is a section taken along the line 4—4 of Fig. 3.
Figure 5:
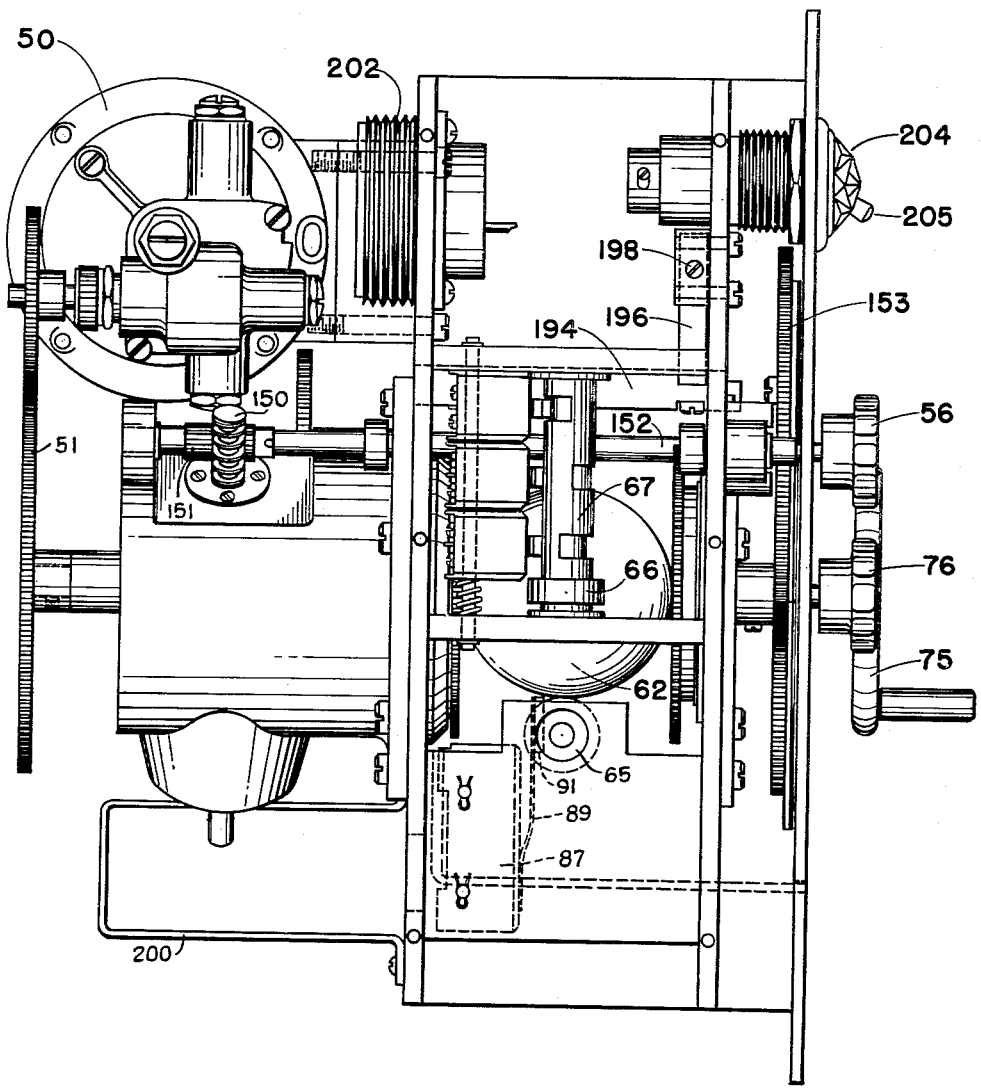
Fig. 5 is a section taken along the line 5—5 of Fig. 4.
Figure 6:
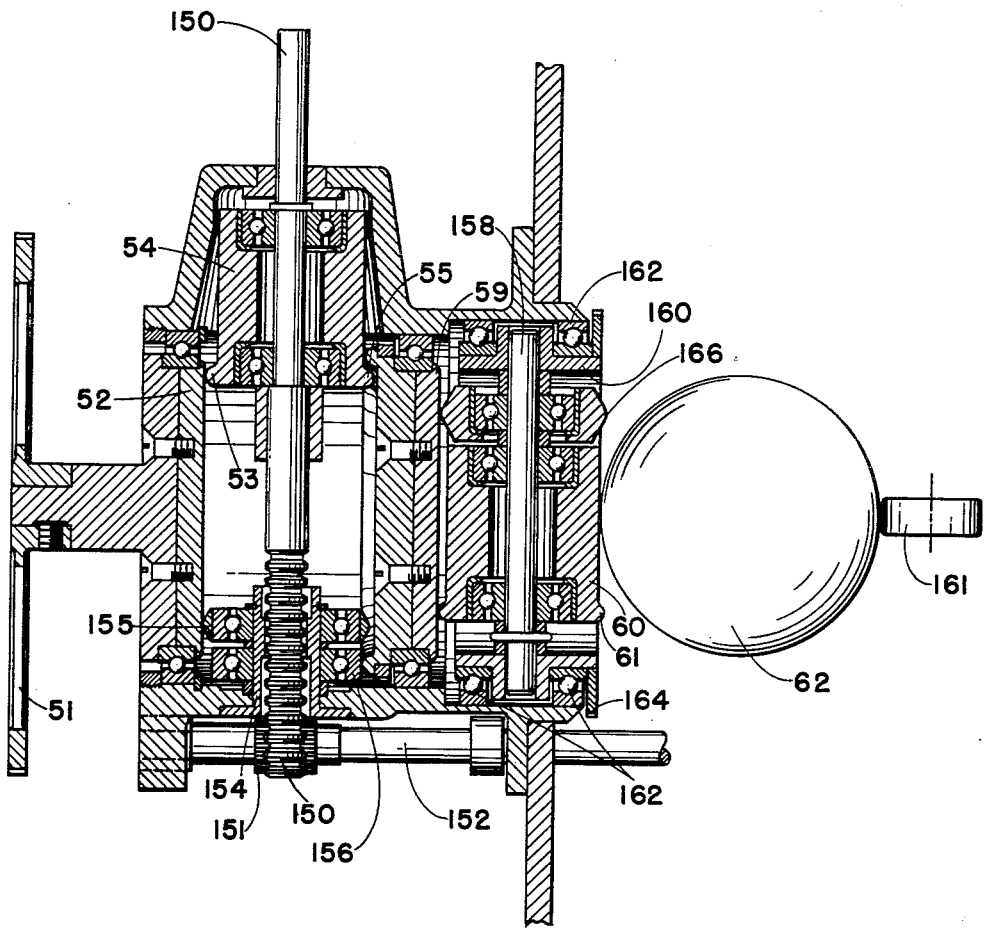
Fig. 6 is a sectional detail of Fig. 3.

Figs. 3, 4, 5, and 6 show details of the speed and course mechanism in the ship's conning unit. The constant speed motor 50, seen best in Figs. 3 and 5, drives a gear 51 which in turn drives the disk 52. As may be seen best in Fig. 6, disk 52 drives a roller 54 which has a ridge 53 which engages the driving surface of the disk 52 and has also a cylindrical surface which drives against a rim 55 on a second disk 59. The roller 54 is carried on the shaft 150 which is equipped with circular grooves, or gear teeth, that are engaged by a pinion 151 (shown in Figs. 5 and 6) mounted on shaft 152. As shown in Figs. 3 and 5, this shaft 152 carries a gear 153 which is driven by speed setting knob 56. The speed indicator 57 consists of a dial mounted directly on gear 153. As shown in Fig. 6, the bushing 154 that supports shaft 150 also supports two ball bearing rollers 155 and 156 which respectively bear against the driving face of disk 52 and the rim 55 of the disk 59 to reduce the eccentric load imposed by the roller 54.

As is shown in Figs. 3, 4 and 6, the roller 60 has a rim 61 which bears against disk 59 to be driven thereby, and the cylindrical portion of the roller 60 drives against the ball 62. The shaft 158 which supports the roller 60 is in turn supported in a ring 160 which turns in ball bearings 162. The ring 160 carries a gear 164 by which the roller 60 may be oriented in accordance with the presumed heading of the ship. Roller 166 is also supported on shaft 158 and bears against the driving disk 59 to reduce eccentric loads. An idler roller 161 bears against the opposite side of the ball 62 to support the pressure exerted by roller 60. This roller 161 is similarly mounted in a ring 163 which carries a gear 165.

As is shown in Fig. 3, disk 55 carries an annular gear 168 which drives an idler gear 170 which in turn drives disk 68 for the rudder control. The two rollers 70 and 72 which are driven by the disk 68, and the differential 74, constitute a unit held in frame 171 which is moved across the plate by a screw 172 which in turn is controlled by shaft 173 and the rudder control handle 75. As the frame 171 is moved, say, to the right from the zero position shown in Fig. 3, roller 72 moves away from the center of disk 68 and so runs faster, while roller 70 moves toward the center and reduces its speed. Since the differential 74 responds to the difference in the speeds of the two rollers, the speed changes in the two rollers tend to drive the spider 174 in the same direction. The use of the two rollers 70 and 72 is especially advantageous here because the rudder is likely to be left at center much of the time that the equipment is in operation. A single output roller would have to be set at the center of the disk for zero output and would rapidly wear a depression in the disk. With the present construction neither roller need ever be brought to the center of the disk. Zero output is obtained when the rollers 70 and 72 have the same speed.

The output of differential gear 74 is transmitted from its spider 174 to its supporting shaft 176 and thence through bevel gear 178 to shaft 180. Fastened to shaft 180 and gear 78 which drives gear 164 to control the orientation of roller 60, gear 79 which drives gear 165 to keep idler 161 aligned with roller 60, gear 182 which drives selsyn generator 82, gear 184 which drives the compass card 80, and knob 76 for setting the course at the beginning of the problem.

Arm 186 (shown in Figs. 2 and 4) is mounted on the frame 171 that moves the rollers 70 and 72 and shows through an aperture in the control panel (not shown) to indicate the rudder angle.

The output roller 64 is driven by the ball 62 (Fig. 4) and drives cam 65 which has three cam surfaces for driving switches 83, 85, and 87. Similarly output roller 66 drives cam 67 which in turn drives switches 84, 86, and 88. These switches are of the double throw snap action type such as are shown in the Patent to McGall 1,960,020. As shown in connection with switch 87 in Fig. 5, the leaf actuator 89 of each switch carries a shoe 91 which rides against the cam surface. As is seen best in Fig. 4, an idler roller 190 exerts a lateral force on the ball 62 to hold it in driving engagement with the rollers 64 and 66. The arm 192 which supports this idler is mounted on a shaft 194 which, as shown in Fig. 5, carries a second arm 196. A screw 198 adjusts the position of arm 196 to control the force exerted on the ball 62 by the idler 190.

Miscellaneous items shown in Figs. 3, 4, and 5 include an electrical condenser 200 for the driving motor 50, electric cable fittings 201 and 202, an electric terminal strip 203, a pilot light 204, and a power switch 205.

Details of a ship image projector, such as the projector 12, are shown in Figs. 7 to 11. Carriage 94 moves laterally on ball bearings 211 to impart the horizontal or each-west motion to the lens 104. It is held in place by a roller 212 which runs under a horizontal bar 214 and also by a roller 216 which runs between a bar 218 and a shaft 220.

Figure 10:
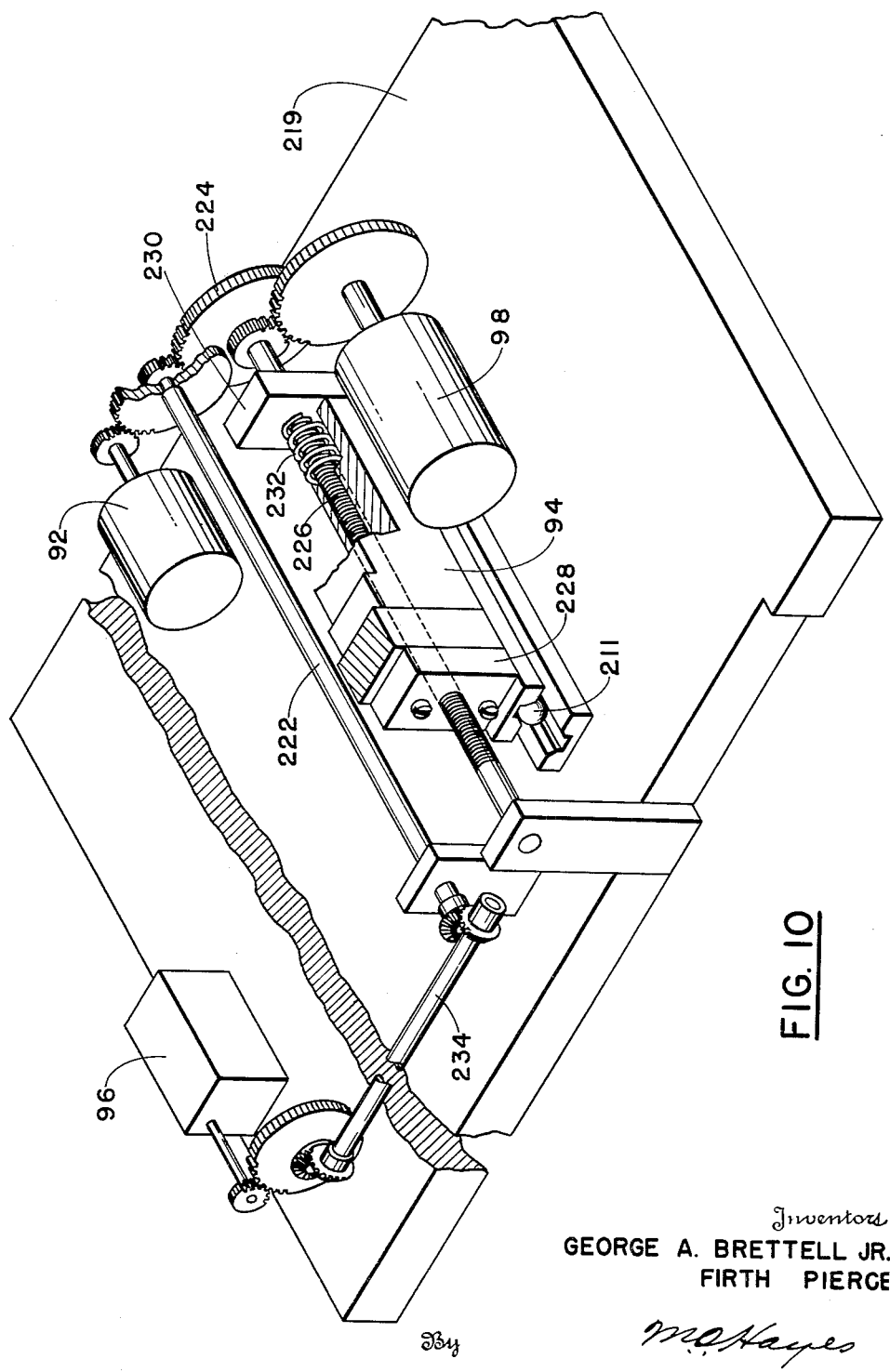
Fig. 10 is a cut-away pictorial view of the portion of the projector mechanism for producing the east-west motion of the ship image.

The drive for the horizontal motion is best shown in Fig. 10. The step motor 92 which is supported on the base 219 of the projector is geared to shaft 222 which in turn drives gear 224 and lead screw 226. The lead screw drives the nut 228 to move the carriage 94. A second nut 230 on the lead screw 226 is held against rotation but is otherwise free of the carriage 94. A spring 323 compressed between this nut 230 and a part of the carriage 94 takes up back-lash in the threads. Gear 224 also drives the potentiometer 98 which is mounted on the base 219. A take-off 234 from shaft 222 drives the longitude indicator 96 which is located at the rear of the projector where it can be observed by the umpire.

Figure 9:
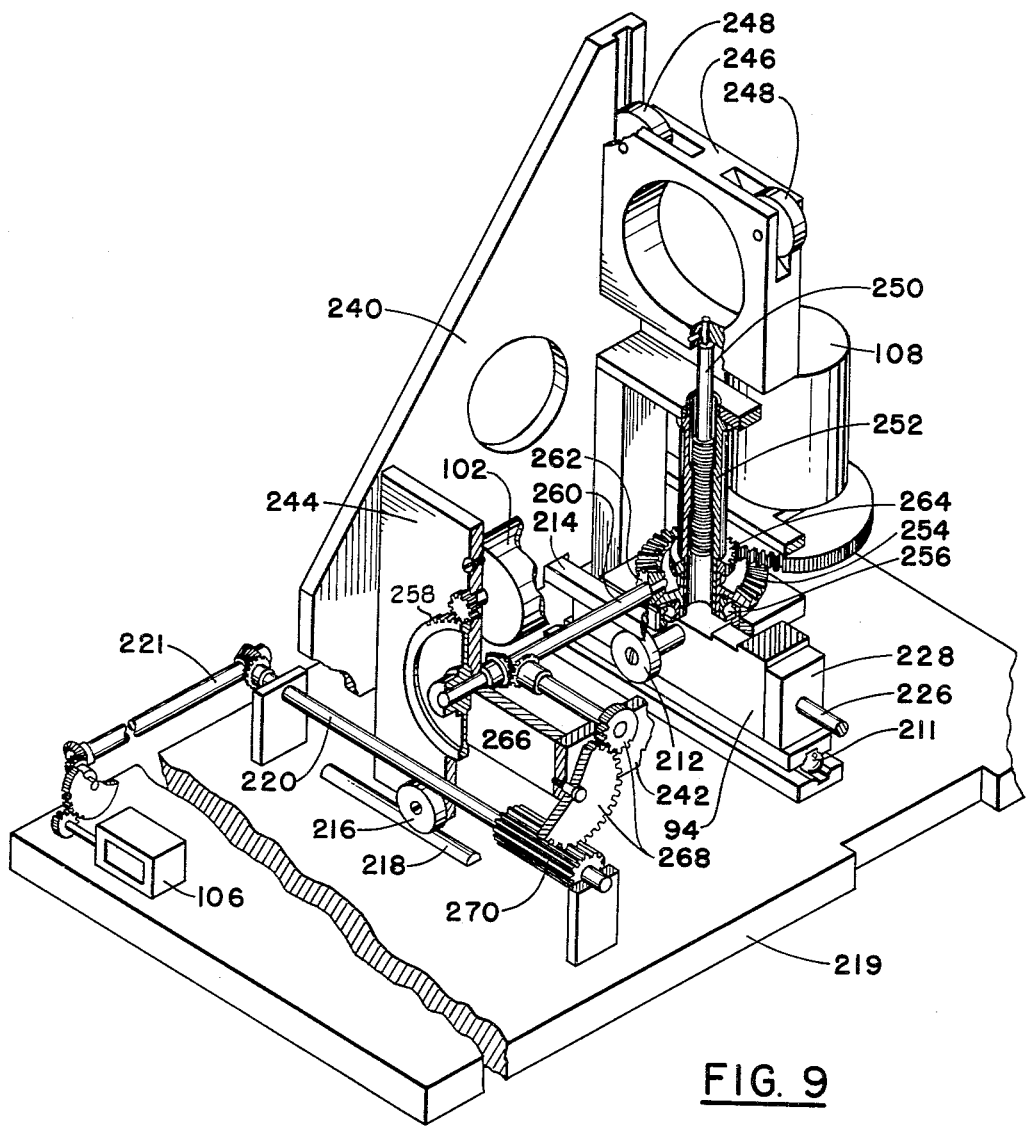
Fig. 9 is a cut-away pictorial view showing the mechanism in the projector of Fig. 7 for producing the north-south motions of the ship image.

The drive for the vertical motion is shown in Fig. 9. The carriage 94 includes a side plate 240, a similar side plate 242 (of which only a fragment is shown) and a cross-plate 244. A frame 246 for carrying the lens 104 moves vertically between the two slide plates 240 and 242, and is guided by rollers 248. A threaded rod 250, which is held against rotation, extends downward into a threaded bushing 252 which is supported on and rotated by a bevel gear 254 which in turn is supported on a ball bearing race 256. The motor 102, through gears 258, shaft 260, and gear 262, rotate the gear 254 to elevate and lower the frame 246 and the lens 104. A second gear 264 on the bushing 252 drives the electric potentiometer 108. A shaft 266 and gears 268, both on the carriage, provide a take-off to a gear 270 mounted on the base of the projector. This gear, through shafts 220 and 221, drives the latitude counter 106.

The magnification exhibited by a lens such as projection lens 104 is equal to the sum of the image distance (lens to screen) and the object distance (lens to ship's aperture) divided by the object distance. In the present construction the image movement is produced by moving the lens parallel to the screen so that this ratio will not change. Accordingly, the magnification of the movement, that is the scale of the movement on the screen, is constant and does not change when the projected beam of light changes from a perpendicular to an oblique angle to the screen. Furthermore, the objective lens 104 preferably is one having a substantially flat field, that is, having the property of focusing light from objects that lie in a plane perpendicular to the axis of the lens into a second plane, the focal plane, also perpendicular to the axis. Accordingly, the images on the screen stay in sharp focus regardless of their movements.

Figure 11:
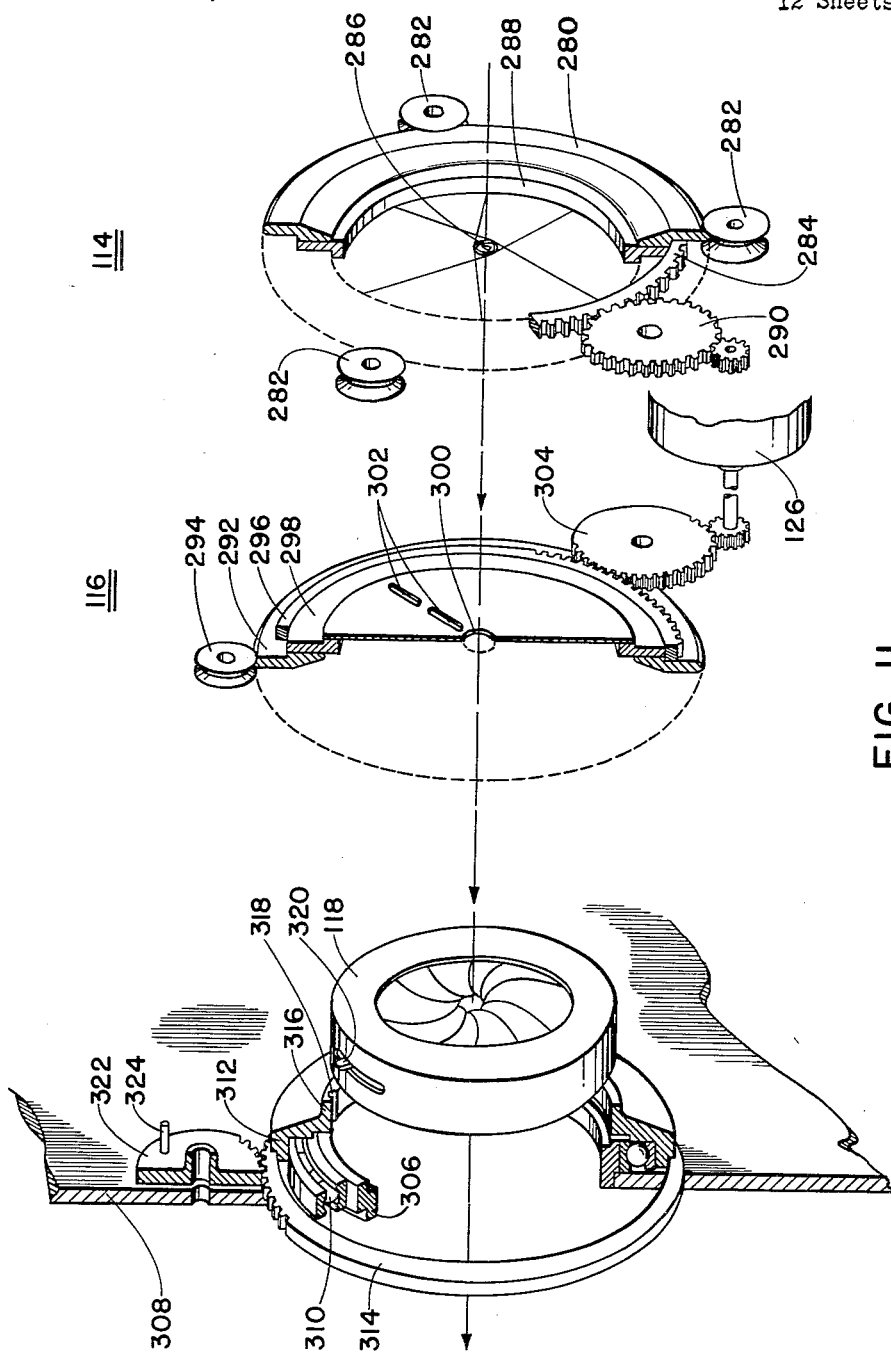
Fig. 11 is an exploded view of a part of the optical projector of Fig. 7.

The optical elements of the lamp house are shown best in the exploded view of Fig. 11, but their compact arrangement can be seen in Fig. 7. A ring 280 which is generally annular in shape is supported on three rollers 282. Mounted on the ring 280 are an annular gear 284, and the ship's reticle 114. The reticle 114 includes a small button 286 supported by three taut wires stretched across the ring 288. The gear 290 which meshes with the annular gear 284 to rotate the ship reticle 114 is driven by the selsyn motor 120 (not shown in Fig. 11) as indicated schematically in Fig. 2.

The gunslit assembly is of somewhat similar construction in that it includes an annular ring 292 supported on rollers 294 and carrying an annular gear 296 and another ring 298. Mounted on the ring 298 is a thin metal disk having a round central hole 300 slightly smaller than the button 286 of the ship's reticle and having also a pair of slits 302 extending radially in a straight line from the center of the disk. The annular gear 296 meshes with idler 304 which is driven by selsyn motor 126.

The iris 118 is supported in a ring 306 mounted in the plate 308. Surrounding the ring 306 is a ball bearing 310 which supports a ring 312 and an annular gear 314. This ring 312 has an inwardly extending portion 316 which surrounds the case of the iris 118. A slot 318 in the portion 316 fits over the actuating lever 320 of the iris 118 so that rotation of the ring 312 opens and closes the iris. A gear 322 driven by the motor 130 (driving connection not shown) meshes with the annular gear 314 to control the iris. A pin 324 on a gear 322 engages a switch 326 when the iris is completely open to let it return under control of spring 323. The projection lamp 112 is equipped with a mirror 328 and condenser lenses 330.

It is desirable that, when the whole installation is set up as shown in Fig. 1, the images from all the projectors should be superimposed whenever their counters 96 and 106 show identical latitude and longitude values. It is also desirable that the projectors be set parallel so that the motions of the projection lenses 104 will be parallel to the screen to make the scale of movement, or magnification of the movement, the same for all the projectors and for all positions on the screen. Since all the projectors are mounted at the same height their images will be at the same height on the screen (for the same latitude indication) provided the individual projectors are leveled up properly. The lamp house (as shown in Fig. 7) moves on ways 334 and 336. When the installation is made, the several projectors are carefully levelled up and arranged parallel to each other and then the individual lamp houses are adjusted laterally to make their images coincide when the latitude readings are alike. Accordingly, the images of all projectors are then maneuverable over the same area of the screen, the maneuvers of course being controlled by the vertical and horizontal movements of the lens 104 of each projector.

Figure 8:
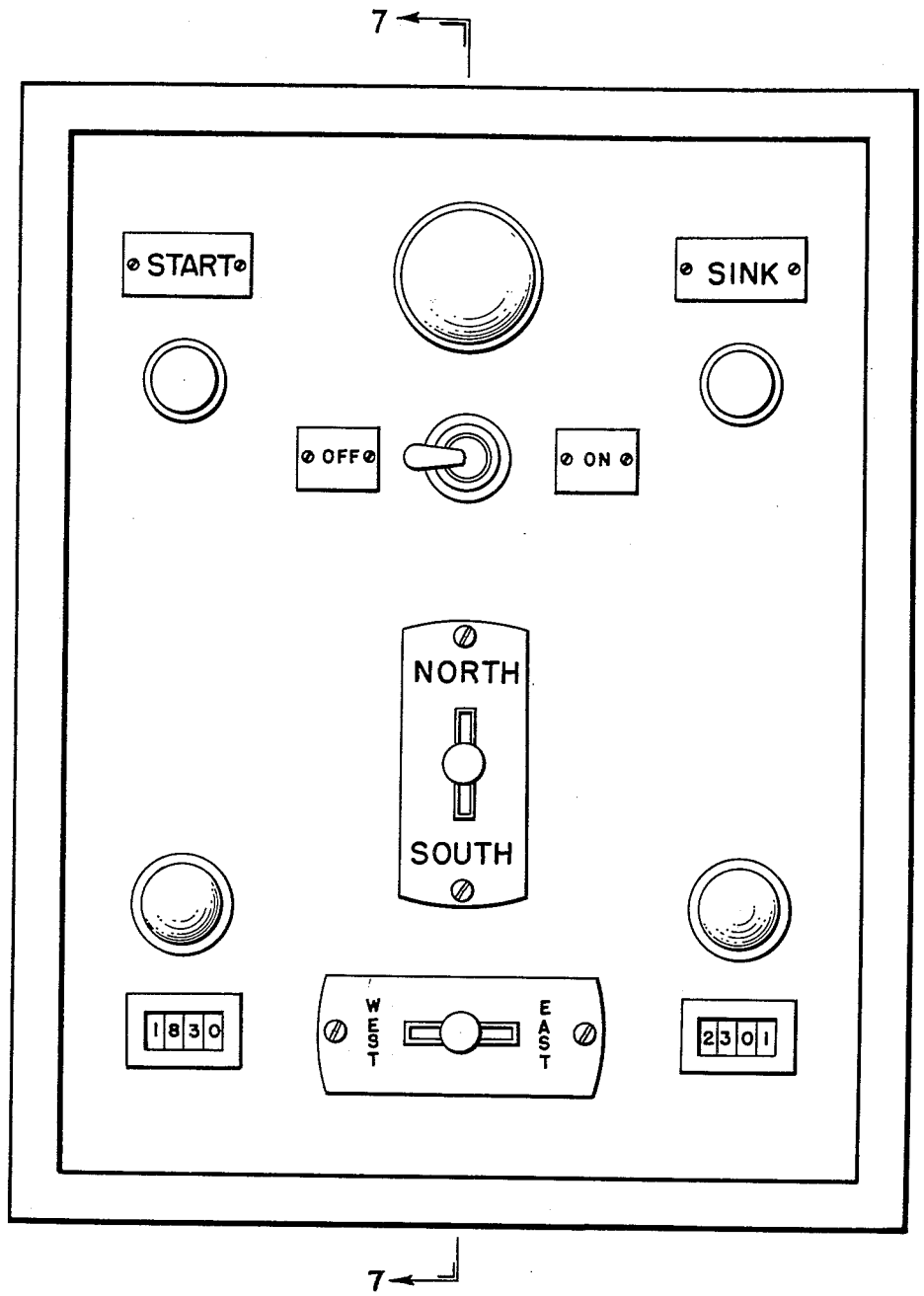
Fig. 8 is a view of the rear of the projector of Fig. 7, showing the manual controls.

Other items shown in Figs. 7 and 8 include limit switches 338 for the horizontal motion of the lens carriage 94, electrical connector 340, electric terminal strips 342, pilot light 344, switches 346 and 348, relays 350 and lamps 352. The quick positioning switches 90 and 100 for setting the position of the ship at the beginning of the problem are located at the rear of the projector where they are convenient for the umpire.

Figure 12:
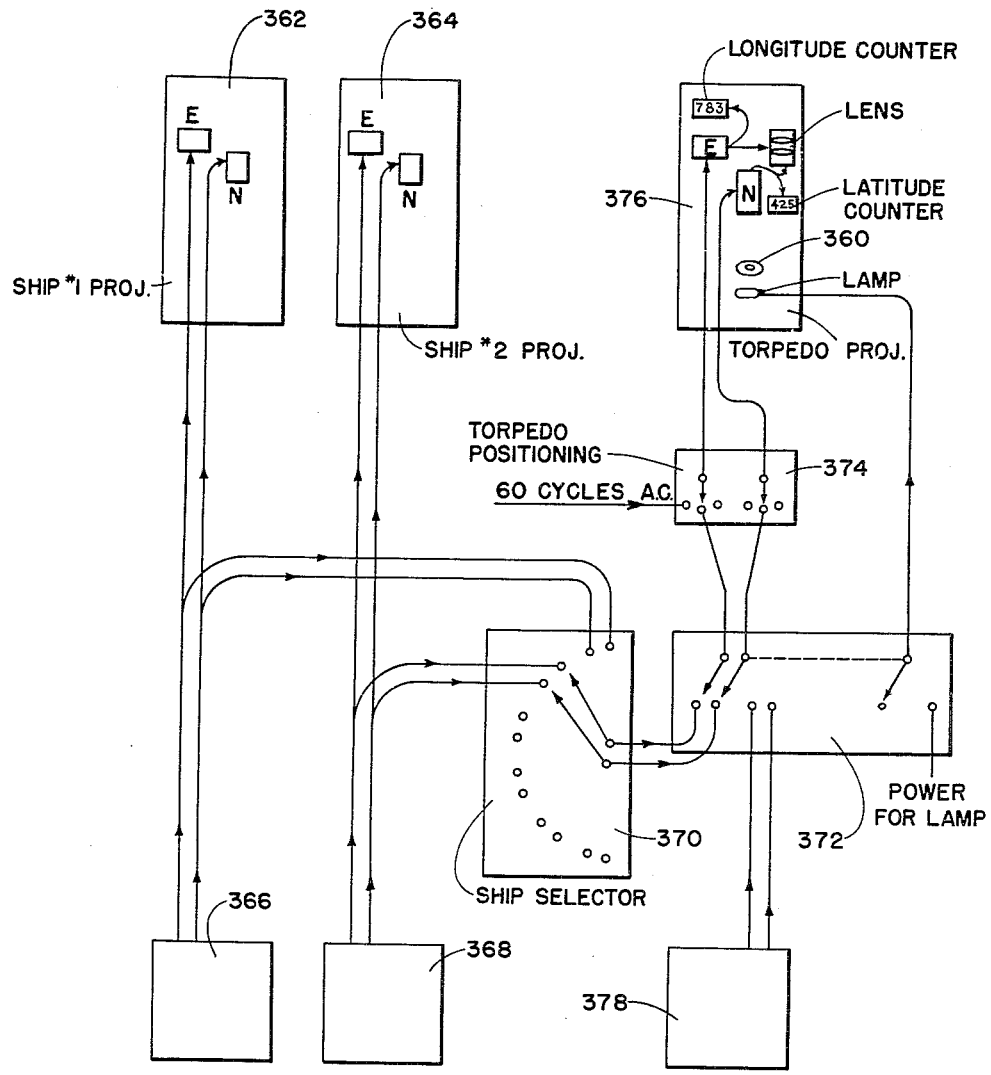
Fig. 12 is a simplified schematic of the control for the simulation of torpedo fire.

Fig. 12 illustrates schematically the manner of controlling torpedo fire. The equipment includes two torpedo image projectors 10 and 24 which are like the ship image projectors, with the principal exception that the lamp house assembly is simpler. Only a single object aperture 360 is provided. This has a hole at its center and it is stationary in the lamp housing. Movements of the torpedo image on the screen are produced by moving the projection lens just as in the ship projector.

Each torpedo image is available for use with any of the ship images, under control of the umpire. When the torpedo image is assigned to a particular ship image the torpedo image projector moves in unison with the projector for that ship image and then when the torpedo is fired it moves off on a course and at a speed determined by its own controls.

The simplified schematic of Fig. 12 shows two ship image projectors 362 and 364 each controlled by its respective conning station 366 and 368 where the north and east motions are generated by switches and transmitted electrically to the projectors. These same electric impulses are transmitted to a ship selector switch 370 so that the impulses from any one of the ship image projectors 366 or 368 may be conducted to the firing switch 372 and thence through positioning switches 374 to the torpedo image projector 376. The course and speed that the torpedo is to follow when fired is set at the torpedo conning station 378. In operation, the torpedo is assigned by the umpire to some one ship by means of a selector switch 370 and then the latitude and longitude of the torpedo are set to correspond with the latitude and longitude of the ship to which it is assigned (by means of the quick positioning switches 374). Thereafter the torpedo image projector receives north and east motions from its ship conning station so that its lens moves in unison with that of the ship image projector. However, the lamp of the torpedo image projector is left dark. The desired course and speed of the torpedo are set at the conning station 378. When the torpedo is fired, firing switch 372 transfers the torpedo control from the ship conn to the torpedo conn 378 and also energizes the lamp in the torpedo image projector. Thereupon, the torpedo image projector 376 projects a round spot on the screen (such as spot 11 in Fig. 1) which starts at the location of the ship image to which the torpedo had been assigned and moves out in accordance with the speed and course from the conning station 378.

Since, as is shown in Fig. 1, the torpedo station is intended to be controlled separately from the ship stations, it is contemplated that signal or communication means be provided so that the man at the torpedo conn can receive instructions from the person conning the ship to which the torpedo is assigned.

It will be apparent that the invention is not limited to the specific embodiment herein shown and described, but rather is capable of many variations within the scope of the claims.

A rectilinear system of coordinates is one in which the axes consist of straight lines and each coordinate distance is measure from one axis parallel to the other. A rectangular system is a rectilinear system in which the axes are perpendicular to each other.

We claim:

1. In combination in a training and practice device, indicator means for simulating a ship, indicator means for simulating a projectile, driving means for each of of said indicator means, conning means for generating simulated ship course and speed components, conning means for generating simulated torpedo course and speed components, means for making the position of the projectile indicator coincide with the position of the ship indicator, means for connecting both indicator driving means to the simulated ship conning means, and means for disconnecting the projectile indicator driving means from the simulated ship conning means and connecting it to the simulated projectile conning means to simulate firing.

2. The combination of claim 1 wherein the indicator-means consist of optical projectors for throwing images on a screen.

3. In combination in a training and practice device, a plurality of indicator means for simulating ships, indicator means for simulating a projectile, driving means for each of said indicator means, conning means for each indicator for generating course and speed therefor, means for selecting which of said simulated ships the simulated projectile is to be assigned to, means operable for moving the projectile indicator to the position of the selected simulated ship, means for connecting the simulated projectile indicator means to the selected ship's conning means, and means for disconnecting the simulated projectile indicator means from the simulated ship conning means and connecting it to the simulated projectile conning means to simulate firing.

4. In an optical projector system of the class described, conning means for setting speed and course, means for resolving components of velocity from the speed and course set on said conning means, a fixed optical projector for throwing an image on a screen, image control means included in the projector for moving the image on the screen in two coordinates, two driving means for imparting two components of motion to said image control means, and means for operating said driving means in response to said components of velocity.

5. The combination of claim 4 wherein said means for operating said driving means includes electric switches, and wherein said driving means include electric motors having polyphase windings whereby their speed and direction of operation is determined by the speed and sequence of operation of said switches.

6. The combination of claim 4 wherein the components of motion resolved by said component resolving means are rectilinear components.

7. In combination in an optical projector for a training device of the class described, an object member having a hole and having also a slot aligned radially with the axis of said hole, a variable aperture aligned axially with said hole, means for turning the object member about said hole for setting the angular position of said slot, means for holding said variable aperture partially open so that said hole is exposed but so that at least the outer portion of said slot is covered, means for expanding said aperture at a predetermined rate for progressively uncovering said slot, and means for projecting an image of said object member and said aperture onto a screen.

8. The combination of claim 7 where there is included in the opening of said object member a mask shaped to indicate a ship, and means for rotating said mask independently of said object member so as to indicate thereby the heading of said ship.

9. In combination in an optical projector for a training device of the class described, an object member having a slot, means for turning said object member about an axis through a point near one end of said slot and substantially on the longitudinal center-line thereof for setting the angular position of said slot, blanking means for covering at least the portion of said slot remote from said axis, and means for moving said blanking means at a predetermined speed for progressively moving the remote edge of the uncovered portion of the slot away from said axis, and means for projecting an image of the uncovered portion of said slot onto a screen.

10. In combination in a system of the class described, two illuminated objects, a separate lens for each of said objects for projecting an image thereof onto a screen, driving means for moving each of said lenses in two coordinates to move said images about on the screen, and selective control means for operating said driving means to move said two lenses independently or in unison.

11. A training system comprising a plurality of fixed projectors including a moveable projection lens mount for moving an image in two rectangular coordinates in the focal plane of said projectors, an image forming mask rotatably mounted in certain of said projectors about the optical axis thereof and shaped to simulate a ship and indicate its heading, an image forming object member rotatably mounted about the optical axis of said certain projectors adjacent said mask and having a central aperture and a radial slot therein, movable means for selectively covering an outer portion of said slot, simulated ship conning means for said certain projectors having speed and rudder controls, means associated with said controls for generating simulated ship speed and course components, means for resolving said speed and course components into rectangular components, means for actuating the lens mount in said certain projectors in accordance with said simulated ship rectangular components to simulate ship movements, means for correlating the turning rate of the ships image with the simulated ships speed and rudder controls, means for rotating said mask in accordance with said course components at said turning rate, a simulated gun bearing control and means for rotating said object member in accordance therewith, means to simulate gunfiring including means for progressively moving said slot covering means radially outward at a predetermined speed, a projectile image forming member mounted in another of said projectors, simulated projectile conning means including speed and course controls for generating speed and course components, means for resolving said speed and course components into rectangular components, means for selectively actuating said lens mount in said other projector in accordance with said simulated ship rectangular components or said simulated projectile rectangular components to simulate firing of a projectile, means for rapidly positioning each of the ship and projectile images in a common focal plane, and means for rapidly setting the initial course of each of said ship images.

12. A training system comprising a plurality of fixed projectors including a moveable projection lens mount for moving an image in two rectangular coordinates in the focal plane of said projectors, an image forming mask rotatably mounted in certain of said projectors about the optical axis thereof and shaped to simulate a ship and indicate its heading, an image forming object member rotatably mounted about the optical axis of said certain projector adjacent said mask and having a central aperture and a radial slot therein, movable means for selectively covering an outer portion of said slot, simulated ship conning means for said certain projectors having speed and rudder controls, means associated with said controls for generating simulated ship speed and course components, means for resolving said speed and course components into rectangular components, means for actuating the lens mount in said certain projectors in accordance with said simulated ship rectangular components to simulate ship movements, means for rotating said mask in accordance with said course component, a simulated gun bearing control and means for rotating said object member in accordance therewith, means to simulate gunfiring including means for progressively moving said slot covering means radially outward at a predetermined speed, a projectile image forming member mounted in another of said projectors, simulated projectile conning means including speed and course controls for generating speed and course components, means for resolving said speed and course components into rectangular components, and means for selectively actuating said lens mount in said other projector in accordance with said simulated ship rectangular components or said simulated projectile rectangular components to simulate firing of a projectile.

13. A training system comprising a plurality of fixed projectors including a moveable projection lens mount for moving an image in two rectangular coordinates in the focal plane of said projectors, a ship image forming mask mounted in at least one of said projectors, simulated ship conning means for said one projector having speed and rudder controls, means associated with said controls for generating simulated ship speed and course components, means for resolving said speed and course components into rectangular components, and means for actuating the lens mount in accordance with said simulated ship rectangular components to simulate ship movements.

14. A training system comprising a plurality of fixed projectors including a moveable projection lens mount for moving an image in two rectangular coordinates in the focal plane of said projectors, a ship image forming mask mounted in at least one of said projectors, simulated ship conning means for said one projector having speed and rudder controls, means associated with said controls for generating simulated ship speed and course components, means for resolving said speed and course components into rectangular components, means for actuating the lens mount in accordance with said simulated ship rectangular components to simulate ship movements, a projectile image forming member mounted in another of said projectors, simulated projectile conning means including speed and course controls for generating speed and course components, means for resolving said speed and course components into rectangular components, and means for selectively actuating said projectile image in accordance with said simulated ship rectangular components or said simulated projectile rectangular components to simulate firing of a projectile.

15. A training system comprising fixed projectors including means for moving an image in two rectangular coordinates in the focal plane of said projectors, a ship image forming mask mounted in one of said projectors, simulated ship conning means for said one projector having means for generating simulated ship speed and course components, means for resolving said speed and course components into rectangular components, and means for actuating the image moving means in said one projector in accordance with said simulated ship rectangular components, a projectile image forming member mounted in another of said projectors, simulated projectile conning means including speed and course controls, means for resolving said speed and course components into rectangular components, and means for selectively actuating said projectile image in accordance with said simulated ship rectangular components or said simulated projectile rectangular components to simulate firing of a projectile.

16. A training system comprising fixed projectors including means for moving an image in two coordinates in the focal plane of said projectors, a ship image forming mask mounted in one of said projectors, simulated ship conning means for said one projector having means for generating simulated ship speed and course components, and means for actuating the image moving means in said one projector in accordance with said simulated ship components, a projectile image forming member mounted in another of said projectors, simulated projectile conning means including speed and course controls, and means for selectively actuating said projectile image in accordance with said simulated ship components or said simulated projectile components to simulate firing of a projectile.

17. A training system comprising a fixed projector including a movable projection lens mount for moving an image in two rectangular coordinates in the focal plane of said projector, a ship image forming mask rotatably mounted in said projector about the optical axis thereof and shaped to simulate a ship and indicate its heading, an image forming object member rotatably mounted about the optical axis of said projector adjacent said mask and having a central aperture and a radial slot therein, movable means for selectively covering an outer portion of said slot, simulated ship conning means for said projector having speed and rudder controls, means associated with said controls for generating simulated ship speed and course components, means for resolving said speed and course components into rectangular components, driving means for actuating said lens mount in two rectangular coordinates in accordance with said simulated ship rectangular components, means for rotating said mask in accordance with said course component, a simulated gun bearing control and means for rotating said object member in accordance therewith, and means to simulate gun firing including means for progressively moving said slot covering means radially outward at a predetermined speed.

18. A training system comprising at least one fixed projector including means for moving an image in two rectangular coordinates in the focal plane of said projector, a ship image forming mask rotatably mounted in said projector about the optical axis thereof and shaped to simulate a ship and indicate its heading, an image forming object member rotatably mounted about the optical axis of said projector adjacent said mask and having a central aperture and a radial slot therein, movable means for selectively covering an outer portion of said slot, simulated ship conning means for said projector having speed and rudder controls, means associated with said controls for generating simulated ship speed and course components, means for resolving said speed and course components into rectangular components, and meanas for actuating the image moving means in said projector in accordance with said simulated ship rectangular components, means for rotating said mask in accordance with said course component, a simulated gun bearing control and means for rotating said object member in accordance therewith, and means to simulate gun firing including means for progressively moving said slot covering means radially outward at a predetermined speed.

19. A training system comprising a fixed projector including a movable projection lens mount for moving an image in two rectangular coordinates in the focal plane of said projector, a ship image forming mask rotatably mounted in said projector about the optical axis thereof and shaped to simulate a ship and indicate its heading, an image forming object member rotatably mounted about the optical axis of said projector adjacent said mask and shaped to indicate gun bearing, simulated ship conning means for said projector having speed and rudder controls, means associated with said controls for generating simulated ship speed and course components, means for resolving said speed and course components into rectangular components, driving means for actuating said lens mount in two rectangular coordinates in accordance with said simulated ship rectangular components, means for rotating said mask in accordance with said course component, a simulated gun bearing control and means for rotating said object member in accordance therewith, and means to simulate gun firing.

20. A training system comprising at least one fixed projector including means for moving an image in two rectangular coordinates in the focal plane of said projector, a ship image forming mask rotatably mounted in said projector about the optical axis thereof and shaped to simulate a ship and indicate its heading, an image forming object member rotatably mounted about the optical axis of said projector adjacent said mask and shaped to indicate gun bearing, simulated ship conning means for said projector having speed and rudder controls, means associated with said controls for generating simulated ship speed and course components, means for resolving said speed and course components into rectangular components and means for actuating the image moving means in said projector in accordance with said simulated ship rectangular components, means for rotating said mask in accordance with said course component, a simulated gun bearing control, means for rotating said object member in accordance therewith, and means to simulate gun firing.

21. A training system comprising a fixed projector including a movable projection lens mount for moving an image in two rectangular coordinates in the focal plane of said projector, a ship image forming mask rotatably mounted in said projector about the optical axis thereof and shaped to simulate a ship and indicate its heading, simulated ship conning means for said projector having speed and rudder controls, means associated with said controls for generating simulated ship speed and course components, means for resolving said speed and course components into rectangular components, driving means for actuating said lens amount in two rectangular coordinates in accordance with said simulated ship rectangular components, and means for rotating said mask in accordance with said course component.

22. A training system comprising at least one fixed projector including means for moving an image in two rectangular coordinates in the focal plane of said projector, a ship image forming mask rotatable mounted in said projector about the optical axis thereof and shaped to simulate a ship and indicate its heading, simulated ship conning means for said projector having speed and rudder controls, means associated with said controls for generating simulated ship speed and course components, means for resolving said speed and course components into rectangular components and means for actuating the image moving means in said projector in accordance with said simulated ship rectangular components, and means for rotating said mask in accordance with said course component.

23. A training system comprising a fixed projector including a movable projection lens mount for moving an image in two rectangular coordinates in the focal plane of said projector, a ship image forming mask rotatably mounted in said projector about the optical axis thereof and shaped to simulate a ship and indicate its heading, simulated ship conning means for said projector having means associated therewith for generating simulated ship speed and course components, means for actuating said lens mount in two coordinates in accordance with said simulated ship components, and means for rotating said mask in accordance with said course component.

24. A training system comprising at least one fixed projector including means for moving an image in two rectangular coordinates in the focal plane of said projector, a ship image forming mask rotatably mounted in said projector about the optical axis thereof and shaped to simulate a ship and indicate its heading, simulated ship conning means for said projector having means associated therewith for generating simulated ship speed and course components, means for actuating the image moving means in said projector in accordance with said simulated ship rectangular components, and means for rotating said mask in accordance with said course component.

References Cited in the file of this patent

UNITED STATES PATENTS

| Number | Name | Date |
| --- | --- | --- |
| 729,491 | Dick | May 26, 1903 |
| 973,962 | Oliver | Oct. 25, 1910 |
| 1,006,292 | Schneider | Oct. 17, 1911 |
| 1,127,725 | Brink | Feb. 9, 1915 |
| 1,172,628 | Partington | Feb. 22, 1916 |
| 1,174,547 | Clason | Mar. 7, 1916 |
| 1,579,880 | Meissner et al. | Apr. 6, 1926 |
| 1,869,275 | Planner | July 26, 1932 |
| 2,136,213 | Hodgman | Nov. 8, 1938 |
| 2,214,050 | Fowler | Sept. 10, 1940 |
| 2,230,149 | Weddington | Jan. 28, 1941 |
| 2,366,554 | Peck et al. | Jan. 2, 1945 |
| 2,389,451 | Mynihan | Nov. 20, 1945 |
| 2,392,142 | Gosswiller | Jan. 1, 1946 |
| 2,406,574 | Waller et al. | Aug. 27, 1946 |
| 2,420,633 | Wittel et al. | May 13, 1947 |
| 2,471,315 | Dehmel | May 24, 1949 |
| 2,478,250 | Daly et al. | Aug. 9, 1949 |
| 2,491,308 | Gorton et al. | Dec. 13, 1949 |